US009211659B2

(12) United States Patent  
De Bock et al.

(10) Patent No.: US 9,211,659 B2  
(45) Date of Patent: Dec. 15, 2015

(54) CAPSULE FORMATION

(71) Applicant: Capsugel Belgium NV, Bornem (BE)

(72) Inventors: Jan Juilen Irma De Bock, Melsele (BE); Jan Donaat Sinnaeve, De Haan (BE); Stefaan Jaak Vanquickenborne, Rijmenam (BE)

(73) Assignee: Capsugel Belgium NV, Bornem (BE)

( * ) Notice: Subject to any disclaimer, the term of this patent is extended or adjusted under 35 U.S.C. 154(b) by 0 days.

(21) Appl. No.: 14/097,144

(22) Filed: Dec. 4, 2013

(65) Prior Publication Data

US 2014/0093606 A1   Apr. 3, 2014

Related U.S. Application Data

(62) Division of application No. 12/446,603, filed as application No. PCT/IB2007/003144 on Oct. 17, 2007, now Pat. No. 9,138,920.

(60) Provisional application No. 60/863,040, filed on Oct. 26, 2006.

(51) Int. Cl.  
*B29C 35/02* (2006.01)  
*A61J 3/07* (2006.01)

(52) U.S. Cl.  
CPC . *B29C 35/02* (2013.01); *A61J 3/077* (2013.01)

(58) Field of Classification Search  
CPC .................................................. B29C 35/02  
See application file for complete search history.

(56) References Cited

U.S. PATENT DOCUMENTS 5,945,136 A    8/1999  Victorov et al.

FOREIGN PATENT DOCUMENTS

EP            0 056 825 A1    8/1982

OTHER PUBLICATIONS

Written Opinion and International Search Report of International Application No. PCT/IB2007/003144 dated Apr. 3, 2008.

*Primary Examiner* — Larry Thrower  
(74) *Attorney, Agent, or Firm* — Klarquist Sparkman, LLP

(57) ABSTRACT

A method and apparatus for forming hard shell capsule components, wherein the capsule components are formed from a material which undergoes gelation upon heating, such as HPMC. A heat station is provided to heat a plurality of molds prior to dipping into a solution of the thermogeling material. The drying conditions following dipping are carefully controlled to control the rate of drying.

9 Claims, 2 Drawing Sheets

CAPSULE FORMATION

This is a divisional of application Ser. No. 12/446,603, filed Oct. 1, 2010 which is a national stage entry under 35 U.S.C. §371 of International Application No. PCT/IB07/03144, filed Oct. 17, 2007 which claims priority to U.S. Provisional Application No. 60/863,040, filed Oct. 26, 2006 all of which are incorporated herein by reference.

The present invention relates to a method and apparatus for forming hard shell capsule components, wherein the capsule components are formed from a material which undergoes gelation upon heating.

The majority of hard shell capsules are manufactured from gelatin. As such, commercially available apparatus for making hard shell capsules is based upon the use of gelatin as the capsule material.

However, there is a need for hard shell capsules which are made of materials other than gelatin. Many of these materials are polymers which under go thermogelation, i.e. they form a gel upon heating. This is in contrast to gelatin which gels upon cooling. Examples of thermogeling polymers include cellulosic polymers such as methylcellulose and hydroxypropylmethylcellulose (HPMC).

The change from the use of gelatin to form the capsules to a thermogeling material causes problems with the capsule forming apparatus. Typically, the apparatus is arranged to dip cold molds into a bath containing a heated solution of gelatin. The molds are then transported through a series of drying ovens or kilns to remove the solvent (typically water or a water/alcohol mixture) and form the hardened capsule components on the molds. The drying ovens are arranged to dry and cool the molded capsule components at the optimum rate in order that the quality of the capsules is not compromised.

The person skilled in the art, however, appreciates that the apparatus needs to be significantly modified in order to be used to form capsule components from thermogeling materials such as HPMC. For example, it has been found that if the molded components are cooled too quickly, they undergo a phase transition from a gel state back to a liquid state, which, of course, results in either poor quality capsule components or little or no capsule material left on the mold.

The present invention sets out to address or ameliorate at least some of the problems of adapting the apparatus normally used to mold gelatin capsule components to be capable of forming capsule components formed from a thermogeling material.

According to a first aspect of the invention, there is provided a process for forming hard shell capsule components wherein the capsule components are formed from a material which undergoes gelation upon heating, the process including: preheating a plurality of component molds to a temperature above the gelation temperature of the capsule material; dipping the preheated molds into a solution of the capsule material; and transferring the molds together with their respective molded components to a drying station, wherein the drying station includes a first section in which the molds are subjected to a temperature in the range 50-90° C. at a relative humidity of 20-90%.

The major differences between the present invention and the known gelatin capsule component molding process are the pre-heating step which pre-heats the molds to a temperature above the gelling temperature, and the first section of the drying station. It has been found that it is necessary to maintain the heat in the first section relatively high in order to prevent the molded capsule components cooling below the gelation temperature and liquefying. However, this relatively high temperature can cause the molded components to dry too quickly, thus causing high stresses and strains to exist within the components. This in turn causes poor quality capsule components which often contain cracks or splits.

By maintaining the temperature and relative humidity within the above-defined ranges in the first section, capsule components of acceptable quality can be obtained.

The term "relative humidity" is used herein to mean the ratio of the actual water vapor pressure at a given time to the vapor pressure that would occur if the air were saturated at the same ambient temperature.

There are many technologies for humidity measurement instruments. Capacitive or dielectric instruments have a material that absorbs moisture, which changes its dielectric properties and enhances its capacitance. Chilled mirror technology uses a mirror that is chilled to the point that moisture starts to condense on it. This temperature is the dew point. With electrolytic technology, moisture is proportional to the current needed to electrolyze it from a desiccant. For resistivity or impedance style sensors, a material absorbs moisture, which changes its resistivity or impedance. In strain gage instruments, a material absorbs water, expands and is measured with a strain gage. Psychrometers, often called wet/dry bulbs, measure relative humidity by gauging the temperature difference between two thermometers, one wet and one dry.

An alternative definition of the combination of temperature and humidity is provided by the wet bulb temperature. Wet bulb temperature is defined as follows: the temperature an air parcel would have if cooled adiabatically to saturation at constant pressure by evaporation of water into it, all latent heat being supplied by the parcel. For the present invention, the first section of the drying station may be maintained at a wet bulb temperature of 35° C. or more.

Thus, the first section of the drying station may subject the capsule components to a temperature in the range 50-90° C. at a relative humidity of 20-90%, provided that the wet bulb temperature within the first section is 35° C. or more.

In certain embodiments of the invention, the temperature is 60-90° C. and the relative humidity is 25-60%. In a further embodiment of the invention, the temperature is 70-80° C. and the relative humidity is 30-50%.

The drying conditions may be further or alternatively defined as providing an environment within the first section of the drying station wherein the wet bulb temperature is 40° C. or more, optionally 45° C. or more.

The temperature and humidity within the first section of the drying station may be achieved by forcing heated, humidified air through the first section. Optionally, the molds may travel in a first direction through the first section of the drying station and the air current may be directed perpendicularly to the direction of travel of the molds. Thus, where the first section of the drying station is elongate and the molds are transported longitudinally through the first section, the direction of the airflow may be transverse to the direction of travel.

The drying station may include a second section downstream of the first section. In certain embodiments of the invention which include a second section, the second section subjects the molded capsule components to a temperature of 30-50° C. and a humidity of 30-50%. In further embodiments, the second section provides a temperature of 35-45° C. and a humidity of 35-45%.

Expressed in terms of wet bulb temperatures, the second section may provide a wet bulb temperature of 20-35° C.

The thermogeling material may be a cellulosic material, such as methylcellulose, hydroxymethylcellulose or hydroxypropylmethylcellulose (HPMC). In an embodiment of the invention, the thermogeling material is HPMC.

In order to condition properly the molded capsule components in the first section of the drying station, they may be retained within the first section for a period of 60-600 seconds.

In an embodiment of the invention, the residence time within the first section is 90-480 seconds, optionally 120-300 seconds, further optionally, 120-240 seconds.

The thermogeling material is typically dissolved in a solvent (e.g. water) into which the molds are dipped. In an embodiment of the invention, the solution of the thermogeling material is maintained at a temperature of 25-35° C. In a further embodiment of the invention, the solution is maintained at 30-34° C.

The molds used in the present process may be carried on a mold carrier for ease of handling. Thus, the mold carrier comprises an array (i.e. two or more) of molds such that all of the molds carried by the carrier may be handled and treated in an identical manner.

In a further embodiment of the invention, the molds are pre-heated to a temperature of 55-95° C. during the preheating step. This temperature is above the gelation temperature of the thermogelation materials that may typically be used and allows for some cooling between the pre-heating step and the molding step, whilst still maintaining a mold temperature high enough to cause the thermogelation material in contact with the molds to gel.

In an embodiment of the invention, the molds are heated to a temperature of 60-90° C., optionally 70-80° C.

In a still further embodiment of the invention, the pre-heating step includes placing the molds into an oven for a time sufficient to heat the molds to the desired temperature and removing the molds for the oven when they are at the desired temperature.

The oven may include a heat zone where heat is applied to the molds and a soak zone where the temperature of the molds is allowed to equalise to the desired temperature, and the molds are moved from the heat zone to the soak zone. The use of a heat zone and a soak zone permits the temperature of all of the molds to be substantially constant when removed from the oven. It is important to have all of the molds at substantially the same temperature during the molding step in order to achieve consistent and uniform molding conditions and thus capsule components having uniform dimensions.

An advantage of the oven defined above is that the whole of the mold is heated to the desired temperature and not just the surface. The heat zone and the soak zone allows the heat energy to penetrate into the core of the mold. This helps minimise cooling of the molds between the heating step and the dipping step.

In an embodiment of the invention, the molds are retained within the oven for 60-300 seconds, optionally 60-200 seconds, further optionally 60-150 seconds. It has been found that this provides sufficient time for the molds to be heated to and equilibrate at the desired temperature. If the molds are within the oven for less than 60 seconds, there is a risk that the molds will either be at too low a temperature or that the temperature will not be uniform across the molds when they exit the oven.

Where the molds are carried on a mold carrier, the oven may be adapted to receive a plurality of mold carriers.

In certain embodiments of the invention, the oven includes a cylindrical drum. In such embodiments, it may be adapted for use with mold carriers whereby the cylindrical drum includes a plurality of mold carrier retaining elements carried on the inwardly facing surface of the drum and each mold carrier is guided into a respective retaining element.

The retaining elements may be circumferentially spaced around the inwardly facing surface of the drum. Furthermore, the drum may be driven to rotate about its axis. In such embodiments, the oven may include a carrier element entrance port and a carrier element exit port, whereby an unheated mold carrier is urged into the drum via the entrance port, is heated in the drum as it rotates and is ejected from the drum at the desired temperature when the mold carrier arrives at the exit port.

By having an oven which includes a cylindrical drum and aligning the retaining elements axially around the circumference of the drum, the conventional process apparatus need only be extended by just over the length of a mold carrier in order to incorporate the pre-heating step. Nevertheless, the conventional apparatus may be extended by more than the length of one mold carrier (e.g. the length of two, three or four mold carriers) in order to provide, for example, ease of access to the oven. In such embodiments, the oven may include input guides and exit guides to guide the mold carriers to and from the oven.

According to a second aspect of the invention, there is provided an apparatus for forming hard shell capsule components, wherein the capsule components are formed from a material which undergoes gelation upon heating, the apparatus comprising a heat station adapted to heat a plurality of component molds to a desired temperature; a molding station comprising a reservoir containing a solution of the capsule material; a drying station; and a transport system for transporting the molds from the heat station to the molding station and from the molding station to the drying station, characterised in that the drying station includes a first section which is adapted to provide a temperature of 50-90° C. at a relative humidity of 20-90%.

As defined above, the oven may be adapted to provide a temperature of 60-90° C. and a relative humidity of 25-60%. Optionally, the temperature is 70-80° C. and the relative humidity is 30-50%.

In an embodiment of the invention, the transport system is adapted to provide the molded capsule components with a residence time in the first section of the drying station of 60-600 seconds.

In an embodiment of the invention, the residence time within the first section is 90-480 seconds, optionally 120-300 seconds, further optionally, 120-240 seconds.

In a further embodiment of the invention, the heat station is adapted to heat the molds to a temperature of 55-95° C.

In an embodiment of the invention, the molds are heated to a temperature of 60-90° C., optionally 70-80° C.

The heat station may comprise an oven. Optionally, the oven is adapted to provide a heat zone, wherein the molds are subjected to heat energy applied thereto, a soak zone, wherein the temperature of the molds is allowed to equilibrate to the desired temperature, and a conveyor to convey the molds from the heat zone to the soak zone.

In the embodiments as described immediately above, the heat zone may comprise one or more infra red emitters as a source of heat energy. The infra red emitters optionally emit infra red radiation having a wavelength of less than about 10 µm, optionally less than about 2 µm.

In a further embodiment of the invention, the oven includes a cylindrical drum. Optionally, the drum includes a drive apparatus adapted to rotate it about its axis. The drive apparatus may include an indexing mechanism adapted to control the rotation of the cylindrical drum from a first index position to a second index position.

The drum may include a plurality of index positions and the indexing mechanism may be adapted to control the rotation of the drum such that it moves sequentially from one index position to the next index position.

In a still further embodiment of the invention, the cylindrical drum includes a plurality of mold carrier retaining elements each configured to receive a respective mold carrier, wherein the mold carriers each carry an array of molds.

Each retaining element may be configured to correspond to a respective index position such that the drum rotates sequentially between adjacent retaining elements Where the oven includes a cylindrical drum, the receiving elements may be circumferentially spaced around the inwardly facing surface of the drum.

The molding apparatus typically includes a greater station where the molds are lubricated prior to dipping. In such embodiments, the heat station may be provided between the greater station and the dipping station.

Alternatively, the heat station may be provided prior to the greater station, such that the molds are heated prior to be being greased. In this embodiment, the heat station is provided between a stripper station (which removes the molded capsule components from the molds) and the greater station. Accordingly, the empty molds (i.e. molds devoid of molded capsule components) may be either heated, greased and then dipped; or may be greased, heated and then dipped.

According to a third aspect of the invention, there is provided an oven for heating a plurality of molds wherein arrays of molds are carried by respective mold carriers, the oven including at least one mold carrier retaining element shaped and configured to receive a mold carrier and retain it within the oven, an entrance port adapted to guide a mold carrier into a respective retaining element and an exit port to permit the heated mold carrier to be ejected from the oven.

In an embodiment of the invention, the oven includes a heat zone, a soak zone and a transport system or conveyor to transport the molds from the heat zone to the soak zone. The heat zone includes elements to impart heat energy to the molds. The heat elements may be infra red emitters or radiators.

In a further embodiment of the invention, the heat elements are infra red emitters which emit infra red radiation having a wavelength of 10 µm or less, optionally 2 µm or less.

The infra red emitters may be individually controlled. This may allow the molds each to receive a substantially identical amount of heat energy and ensure that the molds exit the oven at substantially the same temperature. Thus, the oven may include one or more controllers capable of controlling the output of the IR emitters.

The soak zone may include a flow of heated gas (e.g. air) which circulates around the molds to assist with the equilibration of the temperature between the molds. The heated gas may also prevent, minimise or control cooling of the molds whilst in the soak zone.

In a further embodiment of the invention, the oven includes a cylindrical drum. In this embodiment, the retaining elements may be provided on the inwardly facing surface of the drum. In a still further embodiment, the retaining elements are arranged on the inwardly facing surface of the drum such that they are parallel to the longitudinal axis of the drum (i.e. arranged axially) and are circumferentially spaced from each other.

In a further embodiment of the invention, the cylindrical drum includes a drive mechanism arranged to rotate the drum about its longitudinal axis. The drive mechanism may include an indexing mechanism to control the rotation of the drum from a first index position to a second index position.

In a still further embodiment, the first index position corresponds to a retaining element being aligned with the entrance port and the second index position corresponds to an adjacent or neighbouring retaining element being aligned with the entrance port.

In order to compensate for the expansion and contraction of the cylindrical drum during heating and cooling of the oven, the retaining elements may be loosely secured to the inwardly facing surface of the drum. In other words the retaining elements may be provided with a degree of play when secured to the drum. In such an embodiment, the oven may include a retaining element clamp capable of releasably clamping a retaining element, thereby preventing movement of the retaining element relative to the clamp. The clamp may be arranged to clamp a retaining element which is in alignment with the entrance port to ensure proper alignment between the entrance port and the retaining element, thereby avoiding or minimising the risk of a mold carrier becoming jammed when moving from the entrance port to its respective retaining element within the drum. The clamp may be moveable (i.e. may be adapted to move) between a release position where it is located outside of the drum and a clamping position where it engages a retaining element and maintains it in a fixed position relative to the entrance port.

The clamp may include a pair of opposed jaws which are biased towards each other. In this embodiment, when engaged with a retaining element, the jaws of the clamp are forced apart and the distal ends of the jaws may be located within indentations provided on contact surfaces of the retaining element. The biasing force of the jaws resists movement of the retaining element until the clamp is moved to its release position.

In embodiments where the mold carrier carries a linear array of molds (e.g. in the form of a conventional pin bar for hard shell capsule component manufacture) the retaining elements may be substantially T-shaped and include a longitudinal channel into and out of which the mold carrier can slide.

In an embodiment of the invention, the entrance port and the exit port are aligned. In this embodiment, a heated mold carrier retained within a carrier element is ejected from the drum by a non-heated mold carrier entering the drum via the entrance port. In other words, the heated mold carrier is pushed through the exit port and out of the drum by the non-heated mold carrier being urged into the retaining element which is aligned with the entrance port.

In order to minimise heat loss, the oven may include a housing, which may be insulated. In an embodiment of the invention, the cylindrical drum, the entrance port and the exit port are housed within the housing.

The various embodiments and features of the invention as defined above may be combined with one or more other embodiments or features of the invention unless expressly stated otherwise. Thus, the term "embodiment of the invention" should be construed as "embodiment of the invention as defined in any aspect or embodiment hereinabove". Similarly, embodiments described with reference to one aspect of the invention are equally applicable to the other aspects of the invention, unless expressly stated otherwise. Accordingly, an embodiment described in relation to the first aspect of the invention may also constitute an embodiment of the second or third aspect of the invention.

An embodiment of the invention will now be described in detail, by way of example only, with reference to the accompanying drawings, in which.

APPARATUS

Figure 1:
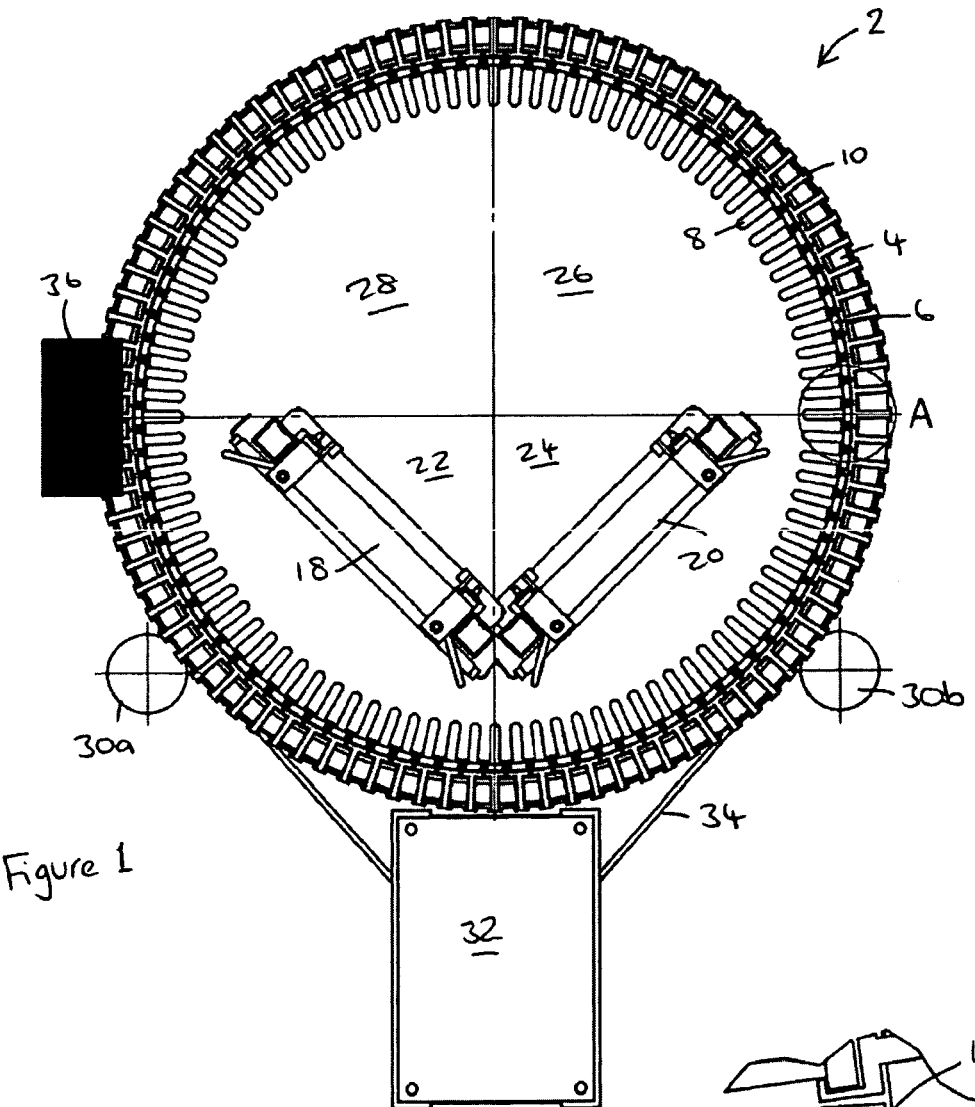
FIG. 1 is a cross section through an oven according to the third aspect of the invention
Figure 2:
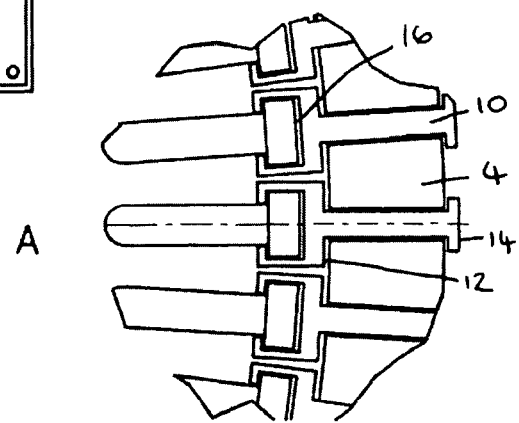
FIG. 2 is an enlarged view of the area designated A in FIG. 1

FIG. 1 shows the internal components 2 of an oven according to the invention. The components are housed within a thermally insulated housing (not shown). The oven is intended to be inserted within a conventional hard shell capsule manufacturing line, which has been modified to extend the line by an amount sufficient to insert the oven.

The oven includes a cylindrical drum 4 within which is retained a plurality of mold carriers 6, each of which carries a plurality of individual molds 8 arranged in a linear array.

The mold carriers 6 are retained within the drum by respective retaining elements 10. The retaining elements 10 each include a locating surface 12 and a pair of locating tabs 14, one at each end of the retaining element 10, for loosely securing the retaining element 10 to the drum 4. The locating surface 12 lies adjacent the inwardly facing surface of the drum and the locating tabs 14 envelop an edge portion of the drum 4. To achieve this, the locating tabs 14 include an extension portion which extends axially beyond the drum 4, a perpendicular portion which extends radially outwards from the extension portion, adjacent the end surface of the drum 4 and a return portion which overlies a part of the outwardly facing drum surface and is arranged parallel to the extension portion. The configuration of the locating tabs 14 at either end of the retaining element 10 loosely secures the retaining element 10 to the drum 4. This allows for the expansion and contraction of the drum 4 and the retaining elements 10 during heating and cooling of the oven.

The retaining elements 10 include a T-shaped channel 16 (known as a T-slide) within which a mold carrier 6 is retained until a longitudinal force is applied to one end of the mold carrier which causes it to slide relative to the retaining element 10 within the channel 16.

Located within the drum 4 are two arrays of infra red emitters 18, 20. The first array 18 is arranged to emit infra red radiation radially towards the molds 8 within the first quadrant 22 of the drum. The second array 20 is arranged perpendicularly to the first array 18 and emits infra red radiation radially towards the molds within the second quadrant 24 of the drum.

The infra red emitters emit infra red radiation having a peak wavelength of about 1 μm. It has been found that when using polished steel molds carried on a steel bar, a wavelength of 1 μm provides the highest absorption and therefore the optimum heating efficiency.

As can be seen from FIG. 1, the first and second quadrants 22, 24 of the drum include infra red emitters to heat directly the molds 8. Thus, the first and second quadrants form the heat zone of the oven. The third and fourth quadrants 26, 28 have no direct heat elements therein and form the soak zone of the oven within which the temperature of the molds can equilibrate. To assist with the equilibration of temperature between the pins, a flow of heated air is passed through the drum 4.

The drum 4 is supported upon a pair of roller bearings 30a, 30b and includes a drive system 32 which drives the drum to rotate via a drive belt 34. The concept of driving a cylindrical drum to rotate via a drive belt is well known and will not be described in detail herein.

The drive system 32 includes an indexing mechanism (not shown) which controls the rotation of the drum. The indexing mechanism permits rotation between a first index position and a second index position, wherein the first and second index positions correspond to the circumferential spacing between adjacent retaining elements. Thus, the drum 4 rotates stepwise with each step being equivalent to the distance between neighbouring retaining elements.

The oven is designed to be fitted within an existing hard shell capsule manufacturing line. Thus, there is a mold carrier guide (the input guide) leading to the oven and a second mold carrier guide (the output guide) leading away from the oven. As noted above, the retaining elements which retain the mold carriers within the drum are loosely secured to the drum, which means that they are able to move within constrained distances relative to the drum. This permitted movement has the potential to cause misalignment between the retaining elements and the input/output guides and consequential jamming of the production line. To address this issue, the oven includes a positioning apparatus 36. The positioning apparatus includes a clamp and a drive system (both not shown). The clamp is driven by the drive system between a release position where it is located outside of the drum and a clamping position where it is engaged a retaining element 10 and maintains it in a fixed position relative to the positioning apparatus 36.

The clamp consists of a pair of opposed, sprung loaded jaws which are biased towards each other. The distal ends of the jaws each include a guide wheel which is sized to locate within a respective indentation provided on the return portion of the locating tab 14

Figure 3:
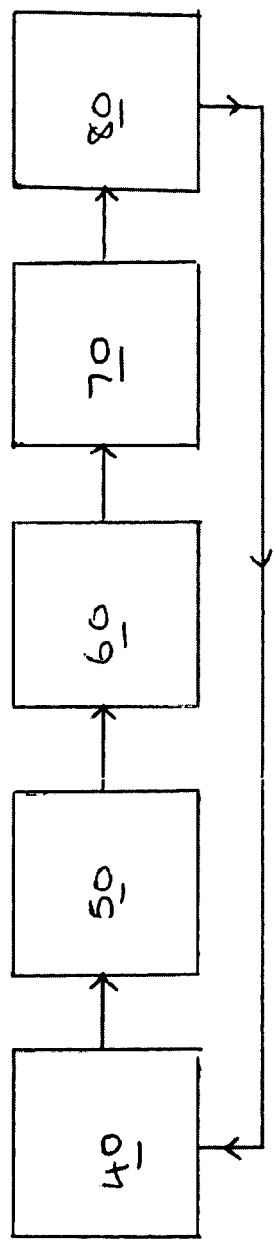
FIG. 3 is a flow diagram detailing the capsule component manufacturing process.

FIG. 3 shows schematically how the oven fits into a conventional capsule manufacturing line, which has been modified to allow insertion of the oven.

The molds are heated in the oven 40 to a temperature of 75° C. and are then transported to the dipping section 50 where the heated molds are dipped into a solution of HPMC in water at about 32° C. After dipping, the molds are transported to the drying station 60. The drying station consists of 6-8 kilns, each of which includes an airflow directed downwards towards the molds. The airflow is controlled such that it is maintained at the desired temperature and the desired humidity, which is discussed in more detail hereinbelow. Once the molded capsule components are dried, they are transported to the stripper station 70, where they are removed from the molds 8. After having the molded components removed from them, the molds 8 are cleaned and greased at the greater station 80 before completing the cycle by entering once again the oven 40 to be heated back up to 75° C. The stripper 70 and greater 80 stations are conventional parts of the capsule component manufacturing line and need not be discussed in detail herein.

In an alternative embodiment, the oven 40 is located between the stripper section 70 and the greater section 80, whereby the molds 8 pass from the stripper section 70 to the oven 40 and then to greater section 80 before being dipped in the dipping section 50.

A skilled person will of course appreciate that the temperature to which the molds 8 are heated within the oven can be carefully controlled by varying either the output energy of the IR emitters 18, 20 or the length of time the molds 8 spend in the oven.

In use, a mold carrier 6 containing a linear array of molds 8 arrives at the positioning apparatus 36. The indexing mechanism pauses the rotation of the drum 4 with a retaining element 10 adjacent the positioning apparatus 36. The positioning drive system drives the clamp forward into engagement with the return portion of the locating tab 14. The guide wheels contact the return portion of the locating tab 14 which causes the jaws to be urged apart against their respective biasing springs. The clamp continues forward until the guide wheels locate within their respective indentations provided on the locating tab 14. The biasing force of the jaws restrains the clamped retaining element 10 and prevents movement thereof.

Once the retaining element 10 is clamped in the desired position, the mold carrier 6 is urged along the input guide and into the T-shaped channel 16 of the retaining element. In so doing, the mold carrier entering the T-shaped channel 16 contacts a heated mold carrier 6 already in the channel 16 and urges it out of the channel into the output guide, which is also aligned with the retaining element to permit the ejection of the heated carrier 6 by the incoming non-heated carrier 6.

After the non-heated mold carrier 6 is retained within the retaining element 10, the clamp is driven out of engagement with the retaining element 10 and the rotation of the drum 4 continues in a stepwise fashion.

The mold carrier 6 that had entered the drum 4 passes through the first quadrant 22, where it is subjected to heat energy from the first array of IR emitters 18. The rotation of the drum 4 then causes it to pass into the second quadrant 24 where it is subjected to heat energy from the second array of IR emitters 20. After it has passed through the heat zone consisting of the first and second quadrants 22, 24, the mold carrier 6 passes into the soak zone made up of the third and fourth quadrants 26, 28. In the soak zone, the temperature of the molds is allowed to equilibrate to the desired temperature of 75° C.

The heated mold carrier is then ejected when the retaining element 10 returns to the positioning apparatus, becomes aligned with the output guide and is urged out of the T-shaped channel 16 in the retaining element 10 by the incoming mold carrier 6.

The heated mold carrier then passes into the dipping section 50, where the molds 8 are dipped into a solution of HPMC (METHOCEL obtained from Dow Chemical Co.). The heat of the molds causes the HPMC to gel on the molds and is retained thereon in the gelled state.

After dipping, the mold carrier 6 is transported to the drying station 60. The molded capsule components are dried in successive kilns. The first three kilns form a first section of the drying station 60 and are maintained at about 80° C. and 40% relative humidity (all humidity measurements being measured using a Testo 365 standard industry humidity probe) by a heated, humidified airflow having an input at the top of the kiln and an exhaust at the bottom of the kiln, the airflow having been conditioned to provide the desired temperature and humidity conditions within the kilns. The remaining kilns form a second section of the drying station 70 and are maintained at about 40° C. and 40% relative humidity. After exiting the second drying station, the molded capsule components are sufficiently dry that they can be removed from their respective molds 8.

A skilled person will appreciate that an intermediate section of the drying station 60 may be provided between the first section and the second section, the conditions within the intermediate section being maintained between the conditions of the first and second sections.

The dried capsule components are then removed form their molds 8 in a known manner at the stripping station 70. The molds 8 are then cleaned and greased (i.e. lubricated with a release agent), again in a known manner, at the greater station 80. After greasing, the cycle is repeated.

The airflow in the first kiln of the drying station needs to be carefully controlled in order to ensure that the quality of the capsules is acceptable. The temperature is maintained at about 80° C. to maintain the HPMC in a gelled stated and the relative humidity is maintained at about 40% in order to control properly the drying rate of the capsules.

The Oven

IR emitters are chosen as the heat source, as they are considered to be the optimum heat source for the polished stainless steel molds. However, a significant amount of the IR energy is reflected from the molds as a result of their shiny (polished) surface. The reflected energy makes little or no direct contribution to the heating of the molds.

It has been found that the use of a cylindrical drum is able to make use of the reflected energy.

It is understood that a "black body" or Planckian radiator is a theoretically ideal body which totally absorbs all incident radiation at all wavelengths. The reflectivity of the black body is therefore zero. In practice, it is possible to construct a close approximation of the ideal black body by the use of a hollow metal sphere housed within an isothermal enclosure, wherein the sphere includes a small hole. Radiation entering the sphere via the small hole undergoes multiple internal reflections and absorptions until near total absorption is achieved.

Using this concept, it was found that the use of IR radiation could be made very efficient by using a cylindrical drum, as the reflected IR radiation is largely retained within the drum and is able to heat further molds with which it contacts. Thus, the molds within the drum are heated by a combination of direct heating from IR radiation emitted from the emitters and indirect heating from reflected IR radiation contacting the molds.

By placing the oven in a housing, an approximation of an isothermal enclosure is possible. This adds to the efficiency of the oven.

Drying Conditions

Experiments conducted by the applicant found that it was important to control the drying conditions in the first section of the drying station to avoid brittleness and cracking of the resultant capsule components.

It was found that drying conditions which resulted in a wet bulb temperature of less than 35° C. resulted in capsule components which did not possess the desired physical characteristics. However, if conditions within the first section of the drying station were maintained such that the wet bulb temperature was 35° C. or higher, then satisfactory capsule components were obtained.

The invention claimed is:

1. An apparatus for forming hard shell capsule components, wherein the capsule components are formed from a material which undergoes gelation upon heating, the apparatus comprising:
    a heat station adapted to heat a plurality of component molds to a desired temperature, wherein the heat station comprises a cylindrical portion configured to hold the component molds while the component molds are heated and a drive apparatus adapted to rotate the cylindrical portion about an axis of the cylindrical portion;
    a molding station comprising a reservoir containing a solution of the material used to form the capsule components;
    a drying station; and
    a transport system adapted to transport the component molds from the heat station to the molding station and from the molding station to the drying station,
    wherein the drying station includes a first section which is adapted to provide a temperature of 50-90° C. and 20-90% relative humidity, and
    wherein the cylindrical portion comprises a plurality of mold carrier retaining elements on an inwardly facing surface of the cylindrical portion such that each of a plurality of mold carriers can be guided into a respective mold carrier retaining element, each said mold carrier comprising an array of said component molds.

2. An apparatus according to claim 1, wherein the capsule material is a cellulosic material.

3. An apparatus according to claim 1, wherein the transport system provides the molded capsule components with a residence time in the first section of the drying station of 60-600 seconds.

4. An apparatus according to claim 1, wherein the heat station is adapted to heat the molds to a temperature of 55-95° C.

5. An apparatus according to claim 1, wherein the heat station is adapted to provide a heat zone wherein the component molds are subjected to heat energy applied thereto, and a soak zone wherein the temperature of the component molds is allowed to equilibrate to the desired temperature.

6. An apparatus according to claim 5, wherein the heat zone comprises one or more infra-red radiant heater elements.

7. An apparatus according to claim 1, wherein the drive apparatus includes an indexing mechanism adapted to control the rotation of the cylindrical portion from a first index position to a second index position.

8. An apparatus according to claim 7, wherein the heat station includes a plurality of retaining elements each configured to retain a respective mold carrier, wherein the mold carriers each carry an array of molds.

9. An apparatus according to claim 1, wherein the cylindrical portion comprises a cylindrical drum and the mold carriers are circumferentially spaced around an inwardly facing surface of the drum.

* * * * *